INVENTOR:
THOMAS M. THOMAS

Feb. 1, 1944.　　　T. M. THOMAS　　　2,340,497
AGRICULTURAL IMPLEMENT
Filed May 3, 1941　　　2 Sheets-Sheet 2

INVENTOR:
THOMAS M. THOMAS
BY
ATTORNEYS.

Patented Feb. 1, 1944

2,340,497

UNITED STATES PATENT OFFICE 2,340,497

AGRICULTURAL IMPLEMENT

Thomas M. Thomas, Huntington Park, Calif., assignor to Killefer Manufacturing Corporation, Los Angeles, Calif., a corporation of Cailifornia Application May 3, 1941, Serial No. 391,737

3 Claims. (Cl. 97—234)

The present invention relates generally to agricultural implements and more particularly to ground working tools of the type that is adapted to be towed by a tractor or the like and also adapted to receive various types of tools to perform various farming operations, such as plowing, cultivating, ditching, and the like.

The object and general nature of the present invention is to provide an improved tool of this type in which is incorporated a transverse tool bar and a pair of laterally adjustable frame units adjustable laterally along the tool bar and each including a complete frame and ground engaging supporting means, with a transverse spreader bar adjustably connected at the front ends of said units to accommodate their adjusted position along the transverse tool bar. It is a further feature of this invention to provide an implement of this kind in which each frame unit includes its own power lift crank axle and associated ground wheel, arranged forwardly of the transverse tool bar at the rear and laterally outwardly of the frame bars of each unit, whereby the desired extent of adjustment is afforded. In this connection it is a further feature of this invention to construct the frame units and associated power lift mechanism so that the units, if desired, may be brought relatively close to one another without the power lift or other parts interfering with such proximate spacing.

Another important feature of this invention is the provision of a flexible hitch swingably connected with the transverse spreader bar so as to be effective independent of the adjustment of the frame units along the spreader bar, with means reacting against one of said units for yieldingly holding the hitch member in desired position to facilitate connecting the implement to be towed by a tractor or the like.

These and other objects and advantages of the present invention will be apparent to those skilled in the art after a consideration of the following detailed description of the preferred embodiment, taken in conjunction with the accompanying drawings.

Figure 1:
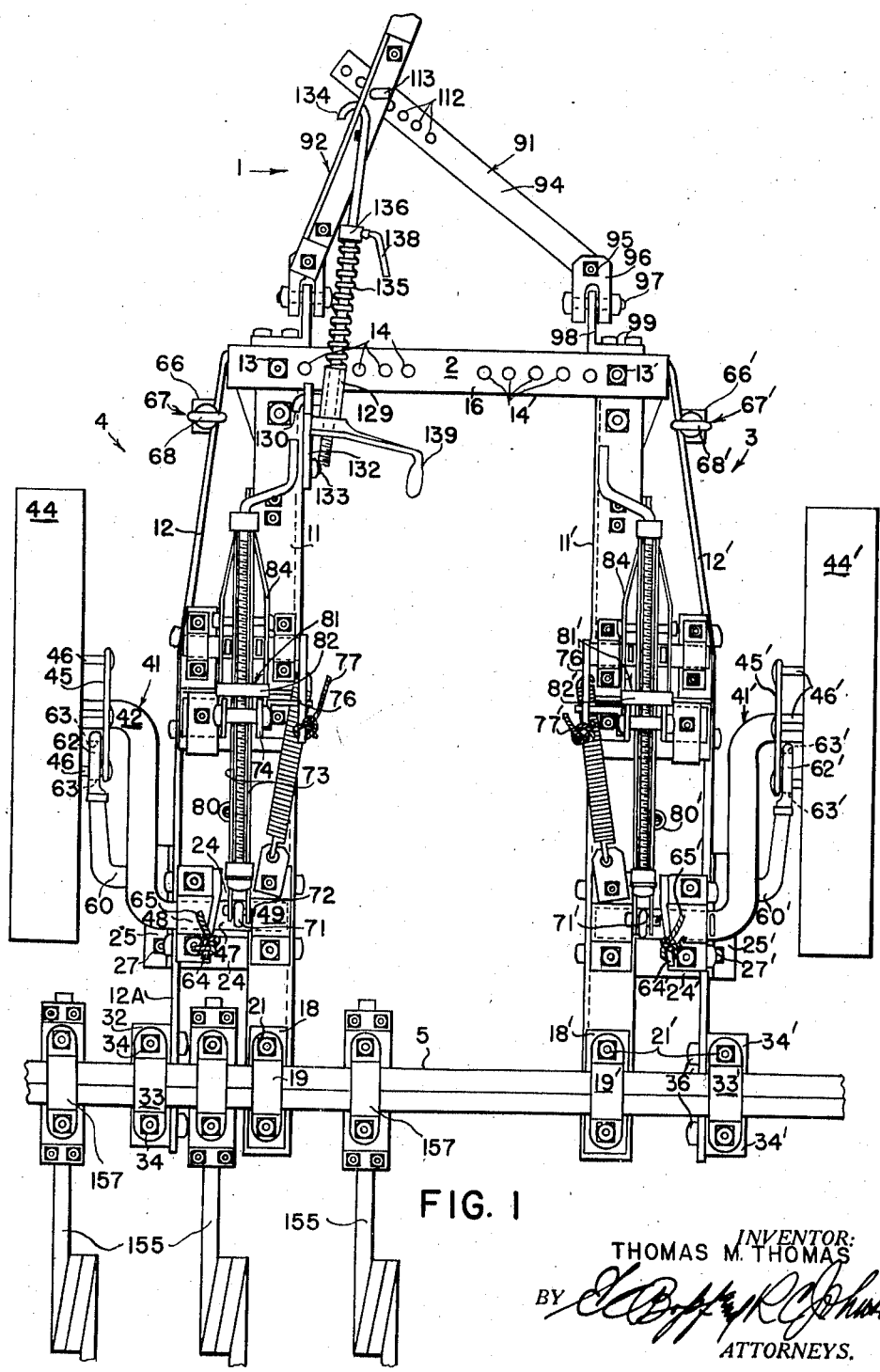
Figure 1 is a plan view of an agricultural machine in which the principles of the present invention have been incorporated, with the frame units in a wide setting.

Referring now to Figure 1, the agricultural implement of the present invention comprises, in general, a hitch frame 1, a transverse spreader bar 2, a pair of right and left hand frame units 3 and 4, each including ground engaging supporting and lifting mechanism to which reference will be made below, a transverse tool bar 5 to which the implement frame units 3 and 4 are adjustably connected, and a plurality of tools 6 of various kinds according to the operation it is desired to perform.

The frame units 3 and 4 are substantially identical, except that one is a right-hand unit and the other a left-hand unit, and hence a detailed description of one will suffice. The left-hand unit 4 comprises a longitudinally extending laterally inner frame bar in the form of an angle member 11 and a laterally outer frame member in the form of a strap or bar 12. The angle bar 11 is bolted, as at 13, in any one of a plurality of bolt holes 14 formed in the horizontal flange 16 of the spreader bar 2, and at the rear end the laterally inner angle bar 11 carries a pillow block 18 in which a V-shaped notch is formed so as to receive the transverse tool bar 5. A clamping cap 19 is secured over the bar 5 by means of bolts 21, which also extend downwardly through the pillow block 18 and the horizontal flange at the rear end of the laterally inner frame angle 11. The laterally outer frame bar 12 includes a rear portion 12A which is parallel to and spaced laterally outwardly of the laterally inner frame angle 11. The frame bar portion 12A is connected with the rear portion of the frame angle 11 by a pair of cross braces 24 suitably secured to the bar 11 and the bar portion 12A. Preferably, the latter connection includes an angle bracket 25 bolted to the bar 12. The cross braces 24 are bolted at 27 to the bracket 25. At the rear end the bar portion 12A carries an angle bracket 31, the horizontal flange of which carries a pillow block 32 which also has a V-shaped notch formed therein to receive the tool bar 5. A clamping cap 33 is secured by bolts 34 to the angle bracket 31, the bolts passing through openings in the pillow block 32, whereby the bar 5 is firmly clamped to the bar 12. The angle bracket 31 is bolted at 36 to the rear end of the frame bar 12.

The front end of the frame bar 12 angles inwardly and has its inner end at the front of the implement disposed closely adjacent and secured to the front end of the frame angle 11 whereby both may be adjusted laterally relative to the spreader bar 2 and secured thereto in draft transmitting relation in any adjusted position.

The right hand frame unit 3 is of substantially the same construction as just described, except that the parts are right hand instead of left hand. Therefore, in the drawings, parts in the right hand unit corresponding to the above described parts in the left hand unit are indicated by the same reference numeral primed.

Figure 3:
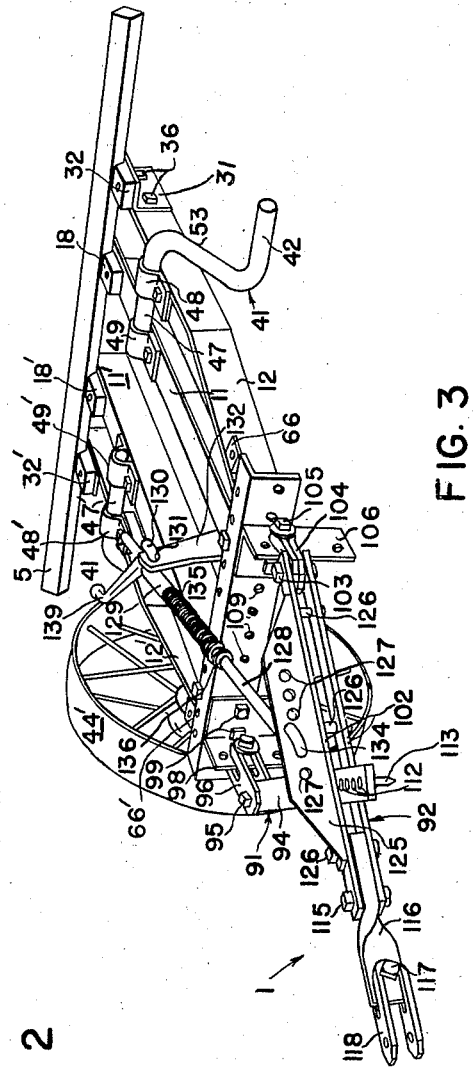
Figure 3 is a perspective view showing the flexible hitch construction and the spreader bar at the front of the machine with which the frame units are adjustably connected.

The ground engaging raising and lowering mechanism for the left hand unit includes a crank axle 41 having a spindle portion 42 (Figure 3) on which a ground wheel 44 is journaled for rotation. Secured to the inside of the wheel 44 is a rack ring 45 which includes a plurality of studs 46 secured to the hub of the wheel 44 and evenly spaced about the axis thereof. The rack ring 45 forms a part of a traction operated power lift which is substantially the same as that disclosed in U. S. Patent 1,888,511, issued November 22, 1932, to Rollie H. Mitchell and Jesse A. Vaughn, to which reference may be made if desired. The crank axle 41 also includes a journaled section 47 mounted for rocking movement by bearings 48 and 49 carried by the frame bars 11 and 12, respectively. The bearing 49 is preferably connected to the laterally outer frame bar 12 by means of an angle bracket. It will be noted that the laterally inner end of the crank axle journal section 47 does not extend laterally inwardly appreciably beyond the frame angle 11. The journal section 47 is connected with the spindle section 42 by means of a crank section 53 which normally extends downwardly and forwardly, both when the frame unit is in its raised position and when it is in its lowered position. The crank axle and ground wheel construction for the right hand unit is substantially the same as just described, and the parts thereof have been indicated by the same reference numerals primed. It will be noted that both ground wheels 44 and 44' are disposed laterally outwardly of the laterally outer frame bars 12 and appreciably forward of the transverse tool bar 5.

Each frame unit includes suitable mechanism whereby during the forward travel of the implement the rotation of the ground wheel or wheels is utilized to cause the crank axles 41 and 41', or either of them, to swing downwardly relative to the associated frame unit or units, thereby raising the latter into inoperative or transport position. Such mechanism is adapted to be released to permit the frame unit or units to lower by gravity into their operating or ground engaging position. The particular details of the power lift mechanism do not per se form any part of the present invention, being substantially the same as the arrangement shown and claimed in the above-mentioned prior patent. So far as the present invention is concerned, therefore, a brief description of the power lift mechanism will suffice.

A shaft 60 is rockably supported in suitable bearings at the under side of the frame bars 11 and 12 and below and slightly forward of the journal section 47 of the associated crank axle 41. The shaft 60 carries a lifting rack 62 provided with teeth 63. A controlling arm 64 is fixed in any suitable manner to the shaft 60 and has connected to it a cable 65 which when pulled forwardly swings the lifting rack or arm downwardly so as to cause the arm 62 to be moved into engagement with the rack wheel 45. As the implement is moved forwardly, the traction wheel rotates, and since the studs of the rack ring 45 engage the teeth on the arm 62, the rotation of the wheel reacts through the crank axle to exert a lifting force against the associated frame. The latter then swings upwardly as the crank axle swings downwardly until, at the desired height, the arm 62 is disengaged from the rack ring 45. Each of the frame units 3 and 4 is equipped with power lift means, as just described, controlled by cables 65 and 65' that extend forwardly to the operator's station on the tractor. The right hand frame unit 3 is provided with similar means to receive the cable 65'. In order to prevent the cables from becoming entangled in any of the operating mechanism, I secure an angle 66 to the front portion of the frame member 12 and mount on it an upstanding rod 67 with an eye 68 at its upper end to receive the cable 65. At its lower end, the rod 67 is flexibly mounted on the bracket 66, as by a spring or the like.

Secured to the journal portion of the crank axle 41 is an arm 71 which extends generally upwardly and is pivotally connected, as at 72, to a pair of spaced sliding bars 73 and the sliding bars 73 carry a suitable stop member cooperating with a latch that is carried by a standard 74, preferably formed of spaced bars and braces rigidly secured to the two frame bars 11 and 12 by any suitable means. The latch just mentioned is under the control of a latch lever 76 to which a cable 77 is connected. By pulling the cable 77, the connection between the sliding bars 73 and the standard 74 is released so that the associated frame may lower relative to the associated crank axle, the latter swinging upwardly and forwardly. Suitable spring means 80 normally holds the rack arm 62 entirely out of engagement with the rack ring 45 unless the cable 65 is pulled forwardly.

The movement of the frame into its lowered position is controlled by an adjustable stop 81 which consists of a nut member 82 carried on the threaded portion of a crank screw 84 supported in suitable bearings and disposed longitudinally on the slide bars 73.

The power lift mechanism of the right hand unit is of substantially the same construction, and the parts have been indicated by the same reference numerals primed.

The hitch frame 1 consists of a pair of rearwardly divergent members 91 and 92. The former consists of a strap member 94 pivoted, as at 95, to a clevis 96. The latter is pivoted by a bolt 97 to a hitch angle 98 that is bolted, as at 99, to the angle bar 2.

The hitch member 92 consists of a pair of spaced straps 102 pivoted, as at 103, to a swivel 104. The latter is pivoted by a bolt 105 to a hitch angle 106 that is secured to the spreader angle bar 2 in the same manner as the hitch angle 98. The spreader bar 2 is provided with a plurality of openings 109 so that the hitch angles 98 and 106 may be fastened in the desired position, and the pivot bolts 97 and 105 are adapted to be disposed in any one of a plurality of openings formed in the forward flange of the hitch angles 98 and 106 so as to swingably connect the hitch frame 1 with the interconnected frame units 3 and 4 at the desired elevation. The hitch member 94 is normally disposed between the two members 102 of the hitch member 92 and is provided with a plurality of openings 112 in which a pin 113 may be disposed, the hitch members 102 being provided with aligned openings to receive the pin 113, and if desired, there may be of a number of sets of openings in the spaced strap members 102, if desired. The forward ends of the strap members 102 are bolted, as at 115, to a bar 116, the forward end of which is twisted into a vertical plane and apertured to receive a bolt 117 by which a clevis 118 is connected thereto, the clevis 118 being adapted to be attached to the drawbar 119 of a tractor or other source of draft by which the implement is towed.

The hitch frame 1 is thus pivotally connected for vertical swinging movement relative to the frame units 3 and 4 about a transverse axis as defined by the pivot bolts 97 and 105. In order to restrain downward swinging movement of the front ends of the frame unit relative to the hitch frame 1, there is provided spring biased means which acts against the hitch bar and reacts against one of the frame units. Such means will now be described.

An angle member 125 is bolted, as at 126, to the upper strap member 102 and has a number of openings 127 formed in its vertical flange. A rod member 128 is formed with a hook end 134 that may be inserted in any one of the openings 127 and has its rear threaded end extended through a sleeve 129 on which a hook 130 is formed. The hook 130 is engaged in the upper apertured end 131 of a bracket 132 that is bolted, as at 133, to the forward end of the laterally inner frame angle 11 of the left hand frame unit. A spring 135 surrounds the rod 128 and is held between the forward end of the sleeve 129 and an adjustable collar 136 that is fixed adjustably to the rod 128, by any suitable means such as a set screw 138. A crank 139 is screwed onto the rear threaded end of the rod 128 and limits the downward swinging movement of the hitch frame 1 relative to the frame unit 4. The upward movement of the hitch frame 1 relative to the frame unit 4 is yieldingly restrained by the spring 135.

Figure 2:
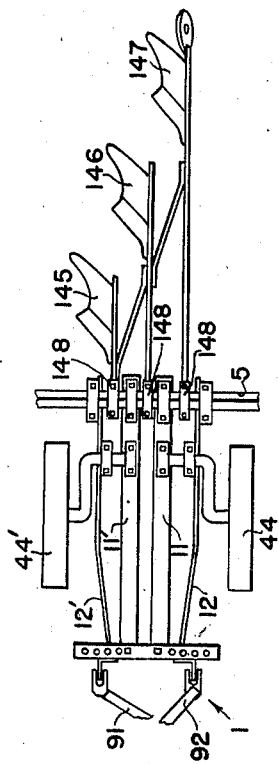
Figure 2 is a view similar to Figure 1 but drawn at a reduced scale, showing the frame units in their narrow setting.

Various kinds of tools may be connected to the rear transverse tool bar 5 and the frame units 3 and 4 may be adjusted laterally inwardly or laterally outwardly along the spreader bar 2 and the tool bar 5 in order to best accommodate the tools it is desired to use. By way of illustration, there is shown in Figure 2 a tool assembly consisting of three plows 145, 146 and 147, the forward beams of which are secured by clamps 148 to the tool bar 5. For an arrangement of this kind it is preferable to have the frame units disposed fairly close to one another, and from Figure 1 it will be noted that since none of the parts overhangs laterally inwardly of the frame angle 11 or 11', there is nothing to interfere with bringing the frame units alongside one another. Since the hitch bars 91 and 92 are connected to the front transverse spreader bar 2 by means independent of the connection between the spreader bar and the front ends of the frame units, the matter of adjusting the latter along the spreader bar to any desired position is simple. All that it is necessary to do is to remove the fastening means connecting the front ends of the frames to the bar 2 and reattach them at the desired spacing, and by loosening the clamping bolts 21 and 34 it is a simple matter to adjust the frames relative to the rear transverse tool bar 5.

Figure 1 is a view showing the arrangement of the parts when tools that require a fairly wide spacing are used. In Figure 1 the bar 5a is long enough to accommodate a plurality of spring cultivator teeth 155 clamped, as at 157, to the tool bar 5, preferably, the cultivator teeth are arranged into spaced apart sets and therefore it is preferable to have the frames 3 and 4 and associated ground wheels in a fairly wide setting. It will be noted that either ground wheel may be raised or lowered, as desired, relative to the associated frame so as to accommodate the conditions encountered or tools used. Ordinarily, when employing plow bottoms, as shown in Figure 2, one wheel can be adjusted to operate at a higher elevation on the land. Since the hitch frame 1 is swingably connected with the two frame units and hence the pivot connection tends to take a position in the line of draft between the draft connection at the front end of the hitch frame and the center of resistance of the tools fixed to the tool bar 5. In order to insure adequate clearance at the front end, the spring biased rod connection between the hitch frame and one of the frame units is adjusted so as to resist the tendency for the front end of the frames to swing downwardly and permit the tools to raise out of the ground.

While there has been shown and described above the details of the preferred embodiment of the present invention, it is to be understood that this invention is not to be limited to the particular details shown and described, but that, in fact, widely different means may be employed in the practice of the broader aspects of this invention.

What is claimed, therefore, is:

1. An agricultural machine comprising a pair of right and left hand frame units, each including a generally longitudinally extending bar disposed at the laterally inner side of each unit and an outer bar including a section spaced laterally outwardly of said inner bar, a transverse tool bar, clamping means at the rear of each frame unit for adjustably securing said tool bar to the laterally inner and laterally outer bars of both of said frame units and accommodating lateral adjustment of the latter along said tool bar, tool means fixed to said tool bar and adjustable along the latter relative to said frame units, generally vertically adjustable ground engaging supporting means for each of said frame units, and means on each frame unit for shifting said ground engaging means, the shifting means and the supporting means of each unit being both disposed laterally outwardly of the vertical longitudinal plane of the laterally inner bar, whereby said units may when desired be laterally adjusted along the tool bar to positions in which said laterally inner frame bars lie substantially against one another, independently of the position of said tool means.

2. An agricultural machine comprising a pair of right and left hand frame units, each including a generally longitudinally extending bar disposed at the laterally inner side of each unit and an outer bar including a section spaced laterally outwardly of said inner bar, a transverse tool bar, clamping means at the rear of each frame unit for adjustably securing said tool bar to said frame units and accommodating lateral adjustment of the latter along said tool bar, generally vertically adjustable ground engaging supporting means for each of said frame units, and means on each frame unit for shifting said ground engaging means, the shifting means and the supporting means of each unit being both disposed laterally outwardly of the vertical longitudinal plane of the laterally inner bar, whereby said units may when desired be laterally adjusted along the tool bar to positions in which said laterally inner frame bars lie substantially against one another.

3. An agricultural machine comprising a pair of right and left hand frame units, each including a generally longitudinally extending bar disposed at the laterally inner side of each unit and an outer bar including a section spaced laterally outwardly of said inner bar, a transverse tool bar, clamping means at the rear of each frame unit for adjustably securing said tool bar to said frame units and accommodating lateral adjustment of the latter along said tool bar, generally vertically adjustable ground engaging supporting means for each of said frame units, and means on each frame unit for shifting said ground engaging means, the shifting means and the supporting means of each unit being both disposed laterally outwardly of the vertical longitudinal plane of the laterally inner bar and said supporting means including crank axles journaled on said frame units and ground wheels journaled on said crank axles laterally outwardly of the laterally outer bars of said units, whereby said units may when desired be laterally adjusted along the tool bar to positions in which said laterally inner frame bars lie substantially against one another.

THOMAS M. THOMAS.